United States Patent
Azad et al.

(10) Patent No.: US 9,663,261 B2
(45) Date of Patent: May 30, 2017

(54) OPTIMIZATION OF PRINT LAYOUT, ESTIMATION OF PAPERBOARD REQUIREMENTS AND VENDOR SELECTION BASED ON BOX ORDERS AND PRINTING MACHINE AVAILABILITY

(71) Applicants: Chandra Azad, Bangalore (IN); Gajanan Rothe, Bangalore (IN); Balamurugan Ramakrishnan, Dindigul (IN); Rajasekhar Allkonda, Bangalore (IN); Niranjan Rao, Bangalore (IN)

(72) Inventors: Chandra Azad, Bangalore (IN); Gajanan Rothe, Bangalore (IN); Balamurugan Ramakrishnan, Dindigul (IN); Rajasekhar Allkonda, Bangalore (IN); Niranjan Rao, Bangalore (IN)

(73) Assignee: Honeywell Limited, Mississauga (CA)

( * ) Notice: Subject to any disclaimer, the term of this patent is extended or adjusted under 35 U.S.C. 154(b) by 44 days.

(21) Appl. No.: 14/539,203

(22) Filed: Nov. 12, 2014

(65) Prior Publication Data

US 2016/0130025 A1    May 12, 2016

(51) Int. Cl.
| | |
|---|---|
| *B41F 33/00* | (2006.01) |
| *B65B 61/02* | (2006.01) |
| *B65B 57/02* | (2006.01) |
| *B31B 1/88* | (2006.01) |
| *B65B 59/00* | (2006.01) |
| *B65B 61/06* | (2006.01) |

(52) U.S. Cl.
CPC .............. *B65B 61/025* (2013.01); *B31B 1/88* (2013.01); *B65B 57/02* (2013.01); *B65B 59/00* (2013.01); *B65B 61/065* (2013.01)

(58) Field of Classification Search
CPC .............................. B65B 59/00; B65B 61/025
USPC ........................................................ 101/483
See application file for complete search history.

(56) References Cited

U.S. PATENT DOCUMENTS

| | | | | |
|---|---|---|---|---|
| 2,743,009 | A * | 4/1956 | Williamson | B65D 85/672 206/396 |
| 3,933,069 | A | 1/1976 | Tall | |
| 4,709,531 | A | 12/1987 | Denda | |
| 5,070,677 | A | 12/1991 | Hicks | |
| 5,810,487 | A * | 9/1998 | Kano | B41J 3/28 101/483 |
| 6,650,433 | B1 * | 11/2003 | Keane | G06F 3/1211 358/1.1 |
| 6,772,037 | B2 | 8/2004 | Palanisamy et al. | |
| 7,055,350 | B2 | 6/2006 | Bonnain | |
| 7,102,774 | B2 | 9/2006 | White | |

(Continued)

FOREIGN PATENT DOCUMENTS

WO    WO2008004667 A1    1/2008

OTHER PUBLICATIONS

PCT/CA2015/000569 International Search Report and Written Opinion, Jan. 18, 2016.

*Primary Examiner* — Anthony Nguyen
(74) *Attorney, Agent, or Firm* — Charles H Jew (57) ABSTRACT

Product packaging technique including the conversion of paperboard into boxes and packages in a process that includes layout optimization of printing plates and takes into account vendor specifications, box order types, and printing machine constraints.

18 Claims, 11 Drawing Sheets

(56) References Cited

U.S. PATENT DOCUMENTS

| | | | |
|---|---|---|---|
| 7,204,070 B2* | 4/2007 | Mertz, II | B65B 11/58 53/139.5 |
| 7,239,408 B1 | 7/2007 | Whitemarsh et al. | |
| 7,316,343 B2* | 1/2008 | Leifeld | B65D 5/4208 206/736 |
| 7,610,114 B2 | 10/2009 | Kapadi et al. | |
| 7,987,016 B2 | 7/2011 | Karhu | |
| 8,120,810 B2 | 2/2012 | Hamzy | |
| 8,469,868 B2* | 6/2013 | Zhang | B31B 1/00 101/483 |
| 2001/0009089 A1* | 7/2001 | Todd | B29C 66/961 53/64 |
| 2003/0098994 A1* | 5/2003 | Tacke | B65D 5/4216 358/1.18 |
| 2003/0230209 A1* | 12/2003 | Gonzalez | B65B 61/025 101/483 |
| 2006/0191426 A1* | 8/2006 | Timmerman | B26D 5/32 101/24 |
| 2007/0181657 A1* | 8/2007 | Barthel | B65D 5/743 229/215 |
| 2008/0121537 A1* | 5/2008 | Sankaran | B65B 5/045 206/223 |
| 2008/0277460 A1* | 11/2008 | Mohn | B65D 3/08 229/108 |
| 2011/0147445 A1 | 6/2011 | Horn et al. | |
| 2011/0194139 A1 | 8/2011 | Xiao et al. | |
| 2013/0174702 A1 | 7/2013 | Holt et al. | |
| 2013/0184133 A1* | 7/2013 | Sugimoto | B31B 1/00 493/29 |
| 2013/0215471 A1 | 8/2013 | Banner | |
| 2014/0025189 A1 | 1/2014 | Sunkara et al. | |

* cited by examiner

OPTIMIZATION OF PRINT LAYOUT, ESTIMATION OF PAPERBOARD REQUIREMENTS AND VENDOR SELECTION BASED ON BOX ORDERS AND PRINTING MACHINE AVAILABILITY

FIELD OF THE INVENTION

The present invention relates generally to product packaging and in particular to the conversion of paperboard into boxes and packages in a process that includes layout optimization of printing plates and takes into account vendor specifications, box order types, and printing machine constraints.

BACKGROUND OF THE INVENTION

The major print business areas include large commercial printers and publishers and the packaging and labeling industries. Effective marketing of retail products often requires suitable containers for presenting the product. The packaging not only protects and stores the item but the container has product displays, specifications and safety information. Retail packaging today is significantly different from what it was just a decade ago and the global consumer packaging market continues to grow at a phenomenal pace. To be competitive, manufactures must not only have quality products but they must also develop smart packaging solutions. Folding boxboards are widely used in an array of retail product packaging.

In the current global scenario, industries are targeting both domestic and international markets, so individual businesses must contend with an ever-increasing combination of different boxboard requirements. At the same time, the retail business environment is becoming hyper-competitive, and as a result printers are under pressure to reduce product cost through improving their operational efficiencies and waste minimization. A critical aspect of being competitive in layout design is to reduce development time while using minimal resources to deliver a competitive product that is desired in the market place.

In order to be efficient, the print industry must develop techniques that take into account the following criteria: (1) designing of print layout based on box orders and availability of printing machines, (2) optimizing print layout based on box orders to reduce the cutting and trimming losses, (3) reducing trim loss generation, and (4) assessing paperboard requirements based on box order and availability of printing machines. In a related issue, while there are large numbers of paper suppliers, it is very difficult for printers to select the correct supplier based on cost, quantity, sizes, available inventory and delivery time.

SUMMARY OF THE INVENTION

The present invention is based, in part. on the development of packaging materials strategies that optimize printing layout for a given paper area so that losses are minimized and maximum paper or board is utilized during conversion to boxes and packages having various configurations. The packaging solutions of the present invention include layout optimization of printing plates and account for vendor specifications, type of orders and machine constraints.

The invention includes a method for optimizing the printing layout based on order availability and a method of optimization printing machine utilization. The invention enables selection of vendor based on order quantity and as per layout and allows for estimation of the requirements of the paperboard for printing and evaluate the vendor based on cost and delivery.

The invention can be used to achieve reductions in losses of box board converting sections, improvements in machine utilization and vendor selection. The invention will minimize paperboard consumption and raw material for printers.

In one aspect, the invention is directed to a print production system that includes: a source of a sheet of packaging material;

a printer having a printer plate that is configured to transfer images to the sheet of packaging material to yield a printed sheet with a predetermined box print layout arrangement that minimizes packaging material wastage by nesting multiple customer orders;

a cutting system that converts the printed sheet into individual pieces of packaging material;

a packaging system that assembles the individual pieces of packaging material into boxes; and a processor that is configured to print the sheet, cut the printed sheet, and package pieces of packaging material based on aggregated customer orders.

In one embodiment, the processor is configured to generate a print layout based on an algorithm including one or more of the following: (i) customer order specifications, (ii) printer vendor specifications, (iii) order delivery timing requirements, and (iv) packaging material properties requirements.

In another aspect, the invention is directed to a method of optimizing production of packaging that includes the steps of:

(a) providing a source of a sheet of packaging material;

(b) providing a printer having a printer plate that is configured to transfer images to the sheet of packaging material to yield a printed sheet with a predetermined box print layout arrangement;

(c) providing a cutting system that converts the printed sheet into individual pieces of packaging material;

(d) providing a packaging system that assembles the individual pieces of packaging material into boxes;

(e) aggregating customer orders subject to the constraints of order delivery timing and packaging material properties requirements; and (f) generating a printed sheet with a predetermined box print layout arrangement that minimizes packaging material wastage by nesting multiple customer orders into a single production run.

DETAILED DESCRIPTION OF THE PREFERRED EMBODIMENTS

Prior to describing this invention in further detail the following terms will first be defined.

Definition table.

| Terminology | Definition |
| --- | --- |
| Banding | Method of packaging printed pieces of paper using rubber or paper bands |
| Banner | A banner is a rectangular window on a web page with text and graphics used for promotional purposes. |
| Blanket | The thick rubber mat on a printing press that transfers ink from the plate to paper. |
| Box board | Board used in the manufacturing of boxes. This board paper can be made from wood pulp or waste paper, and it can be clay coated, lined or plain. |
| Converting | Any operation, applied after the normal paper or board manufacturing process, which changes the physical shape or appearance of paper and board, e.g. slitting, cutting into sheets, bag and box manufacture, printing, etc. |
| Corrugated board | These large boxes (often brown in color) protect the contents from damage. Corrugated board is strong because it is composed of a top and bottom layer and in between there is a triangulated section. A triangular section is very strong compared to its weight. |
| Creasing | The process of making an indentation in board materials in order to produce a line along which it may be folded. This enables the folding of a blank to produce a shaped package. |
| CYMK | Cyan, magenta, yellow and black. The blending of these inks during printing creates full-color publications and images. |
| Density | The degree of color or darkness of an image or photograph |
| Die | Metal rule or imaged block used to cut or place an image on the printed piece in the finishing process. |
| Die cutting | Cutting images in or out of paper, by use of a die. Cutting or stamping a sheet or web of paper or board with a shaped knife to produce a special shape or blank |
| Embossing | A shape is pressed into a sheet of paper with a metal or plastic die, creating a raised (embossed) image. |
| Emulsion | Light sensitive coating found on printing plates and film |
| Gloss | A shiny coating on paper. Gloss coating allow very little ink absorption, providing excellent color definition and contrast. |
| Grain | The direction in which the paper fiber lie. |
| Laminating | The fixing of a ready-formed layer of plastic, paper, metal, etc. to paper or board normally using an adhesive. |
| Packaging | Packaging is the science, art and technology of enclosing or protecting products for distribution, storage, sale, and use. Packaging also refers to the process of design, evaluation, and production of packages |
| Palletizing | The placing of paper and board packaging products onto a pallet and then wrapping and labelling the whole unit. |
| Paperboard | Paperboard has a grammage higher than that of paper, but lower than that of cardboard. A distinction is made between single-layer and multilayer board. |
| Plate cylinder | The cylinder on a printing press onto which the plate is fixed |
| Plate making | A prepress process where a "flat" (masking sheet with negative stripped into it) is laid on a plate, the plate is exposed and then processed. The plate is then ready to be taken out to the press |
| Prepress | Processes performed on a printing order prior to its going to the press to be printed. (Examples: typesetting, layout, scanning) |
| Printing plate | A thin object (plate) made of either paper or metal which is light sensitive and causes an image is transferred to paper while on printing press. |
| Proof | A method of checking for error to printing an order. |
| Ream | Five hundred sheets of paper. |
| Register | To position print in the proper position in relation to the edge of the sheet and to other printing on the same sheet. |
| Register marks | Cross-hair lines or marks on art, plates, and paper that help position the art. |
| Resolution | The degree of image sharpness that can be produced by a piece of equipment. Resolution is measured in dot per inch (dpi). |
| Reverse | Type or other image reproduced by printing background rather than image itself, allowing the paper or underlying ink to show the shape of the image. |
| Sheet fed press | A press that prints single sheets of paper, as opposed to a web press. |
| Slitting | The passing of a moving web of paper or board from a reel though knives resulting in the production of a number of reels of smaller width and/or diameter. |
| Trim marks | Similar to crop or register marks. These marks show where to trim the printed sheet |
| Trim size | The final size of one printed image after the last trim is made. |
| Web | A continuous length of paper or board travelling along a paper machine or through converting equipment. |
| Web press | A high run, fast speed printing press that uses rolls of paper rather than individual sheets. |

Figure 1:
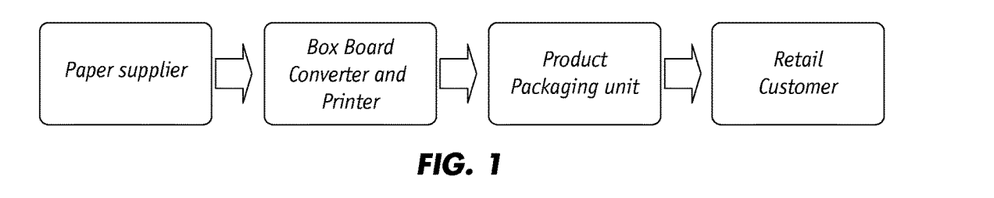
FIG. 1 is a high-level flow diagram depicting the relationship of major components in retail product packaging.

Large commercial orders for retail goods are typically based on market forecasts. As illustrated in FIG. 1, with the forecast, a manufacturer develops packaging and labeling for a particular retail product. The paper supplier fabricates the box board in accordance with the size and other requirements and the box board converter and printer cuts, folds and finishes the box board into boxes with appropriate labels, art work and the like. The products are then packaged in the boxes that are sold to the retail customer.

Paperboard is characterized by various properties including, for example: moisture, thickness, basis weight, optical characteristics (such as color, gloss and brightness) and strength properties (such as stiffness, bursting strength, coefficient of friction, and folding endurance). These properties similarly determine box board quality. Aside from these properties, two other major factors that affect the quality of box board construction are the boxboard's gluing and flatness. Glue must be applied so that joints are secured enough to enable stacking of boxes. The panels of the box board must be squarely aligned.

Folding box board dimensions are given in length, width and depth (l×w×d). As per the orientation of a finished carton on the shelf, the length and width are generally defined as the dimensions of the opening and/or end flaps of the box, with the length being the front panel and width the side panel (that is, the length is usually greater than the width). The standard way of representing a carton in a layout drawing is with the printed side up and glue flap on the left.

Figure 2A:
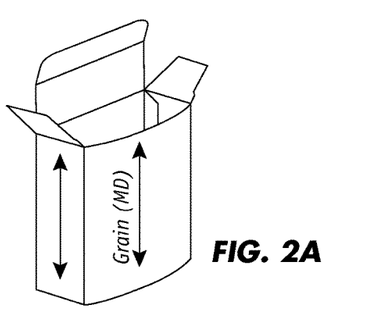
FIGS. 2A and 2B illustrate boxes that are constructed of box board with the incorrect and correct grain directions, respectively.
Figure 2B:
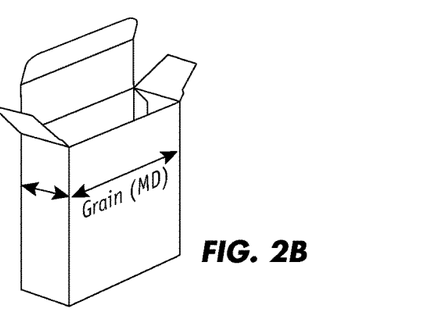

With respect to carton design, grain direction is very important for box construction. FIG. 2A shows a carton with incorrect grain direction and FIG. 2B shows a carton with correct grain direction. The grain direction is parallel to the machine direction (MD) of the paper machine from which the box board is made. The impact of having the wrong grain direction is that the box exhibits a bulgy structure as in shown in FIG. 2A and lacks the improved structural integrity as exhibited by the box of FIG. 2B. Thus, one feature of the invention is to optimize the printing layout based on grain direction.

Figure 3A:
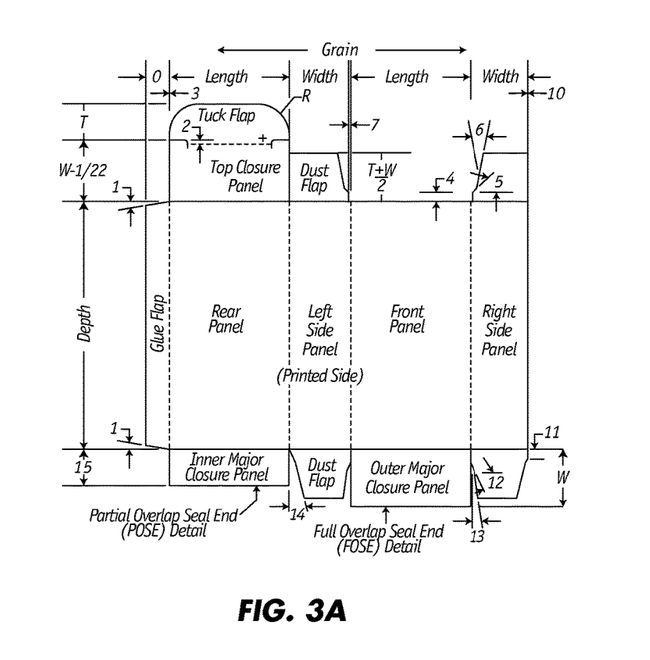
FIGS. 3A and 3B show the standard folding layout for the carton as shown in FIG. 3C.
Figure 3B:
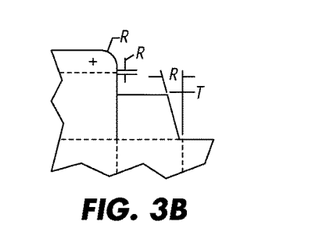
Figure 3C:
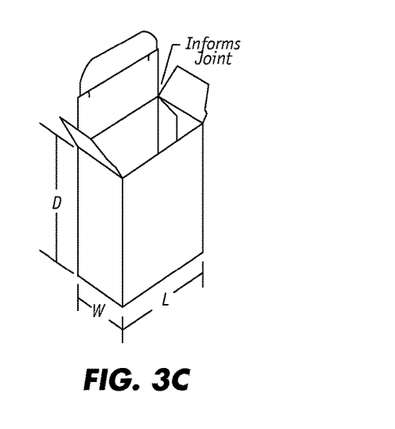
Figure 4:
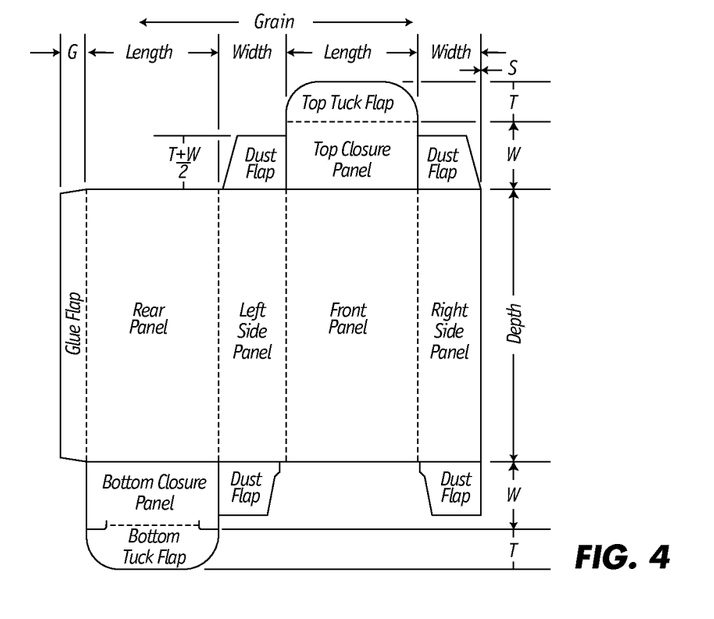
FIGS. 4 and 5 show the French reverse tuck and standard straight tuck layouts.
Figure 5:
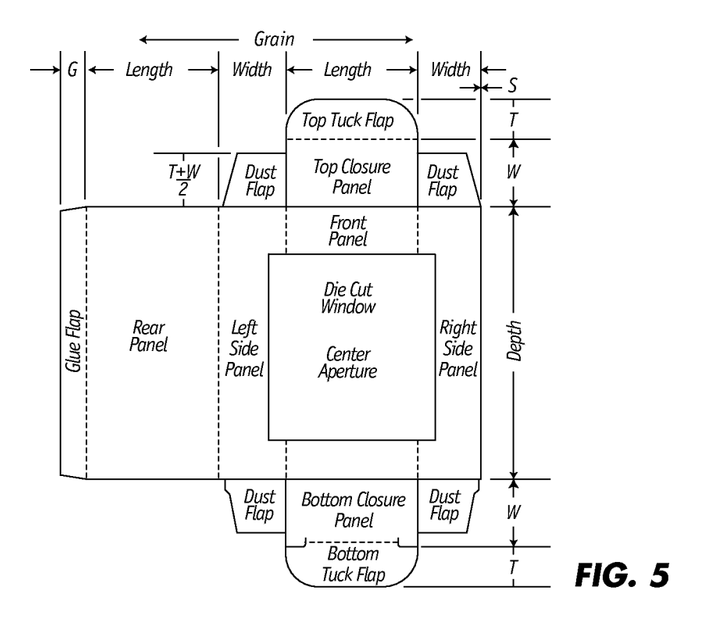

The layout drawings for a carton must show all of the relevant dimensions and angles and for any specific carton configuration and there can be several alternative designs or styles. Using the carton depicted in FIG. 2B as an example, FIGS. 3A, 3B, and 3C illustrate three different styles of layout that can be used. Each represents a template or pattern from which the box board is cut, folded and glued to create the desired box. FIGS. 3A and 3B show the configuration for the Standard Folding Layout; as shown, various dimensions and angles of the layout are designated by reference numbers. In practice, the dimensions for the completed box shown in FIG. 3C depend on the size the item(s) to be packaged and the dimensions of the layout can be scaled as required. FIG. 4 shows the configuration for the French Reverse Tuck layout and FIG. 5 show the configuration for the Standard Straight Tuck layout, which also includes a die cut window for exposing the interior of the box. As further discussed herein, once a layout is selected, individual layouts are printed on sheets during a pressrun wherein the layouts form a pattern on the sheet before being cut and folded.

Figure 6A:
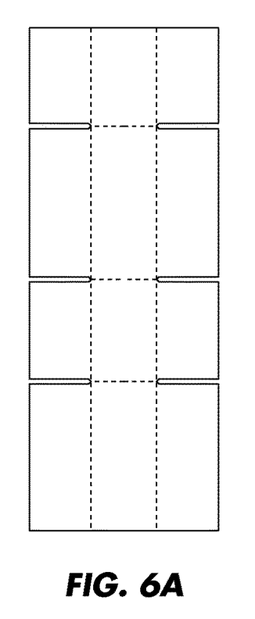
FIGS. 6A, 7A, 8A, 9A and 10A show the layouts for 5 different corrugated boxes that are illustrated in FIGS. 6B, 7B, 8B. 9B and 10B, respectively.
Figure 6B:
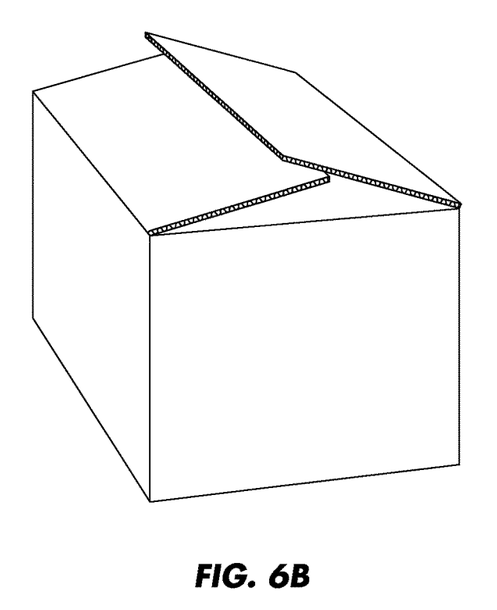
Figure 7A:
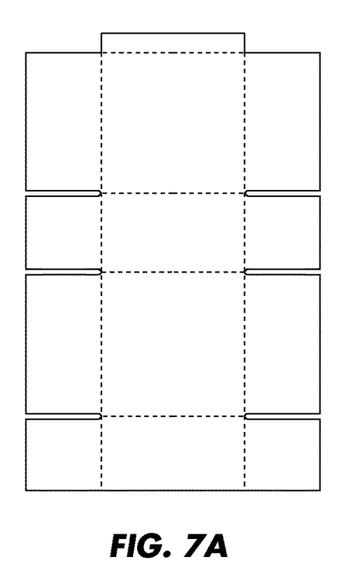
Figure 7B:
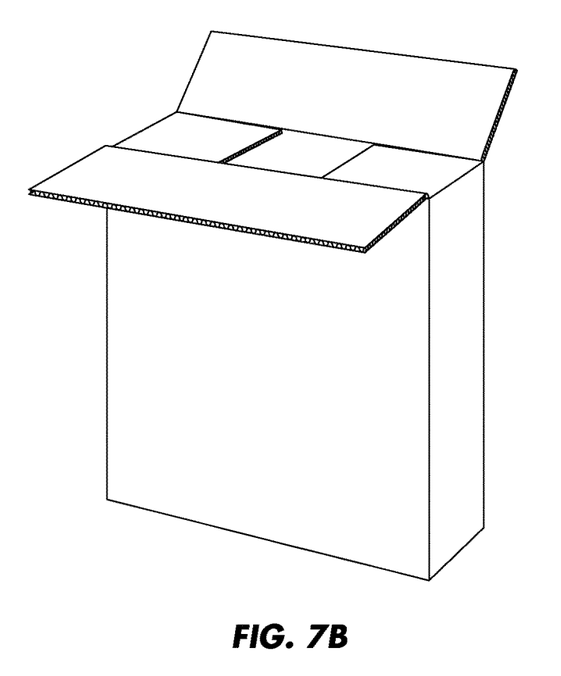
Figures 8A, 8B:
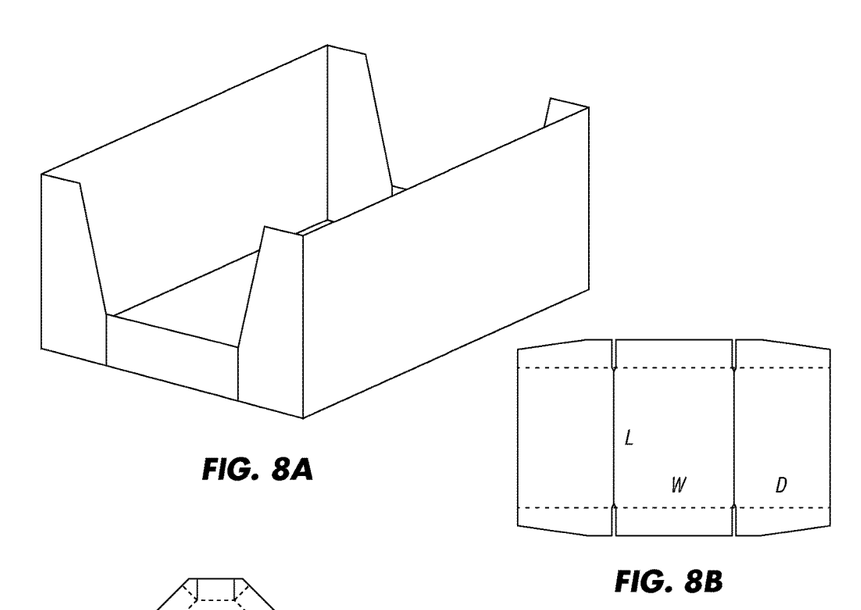
Figure 9A:
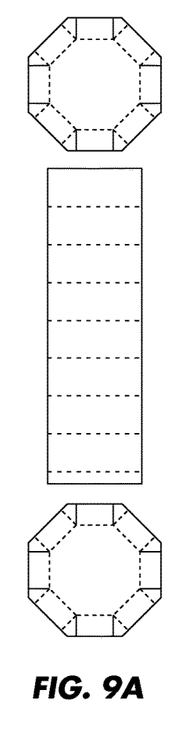
Figure 9B:
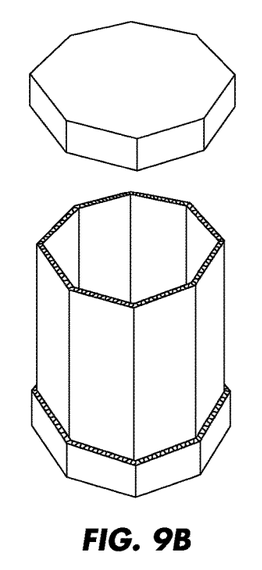
Figure 10A:
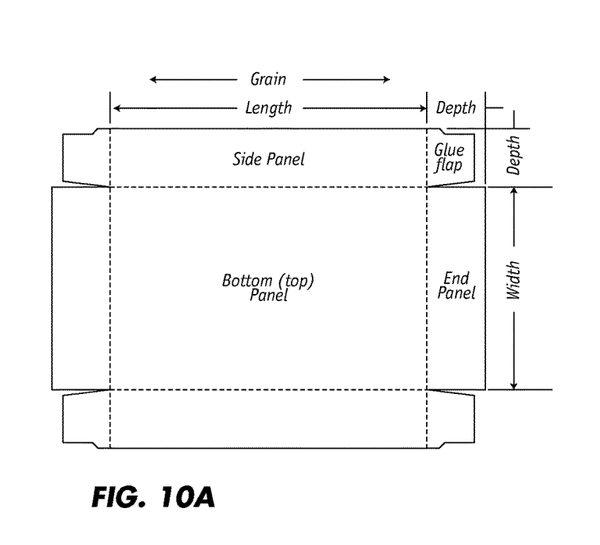
Figure 10B:
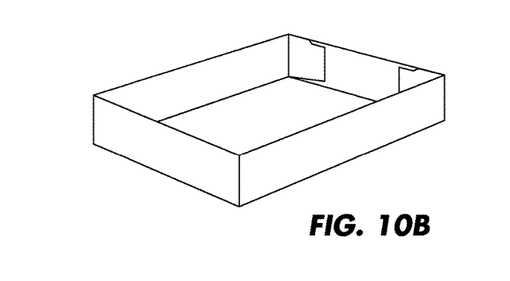

There are generally five different types of stock corrugated boxes that are used to package retail goods. FIGS. 6A and 6B show the layout and corresponding folded box, respectively, of the Overlap Slotted container design. FIGS. 7A and 7B show the layout and corresponding folded box, respectively, of the Full overlap container board. FIGS. 8A and 8B show the layout and corresponding folded box, respectively, of the Display Tray. FIGS. 9A and 9B show the layout and corresponding folded box, respectively, of the Bulk Container. FIGS. 10A and 10B show the layout and corresponding folded box, respectively, of the Tray Style Carton. All of the above the corrugated boxes are square type. While generating the layout, the square patterns are arranged in such manner that can utilize maximum deckle (width) of the printing machine. Typically, the printer deckle can be optimized through nesting of multiple boxes in the same layout.

Stages in Making Folding Cartons.

Figure 11:
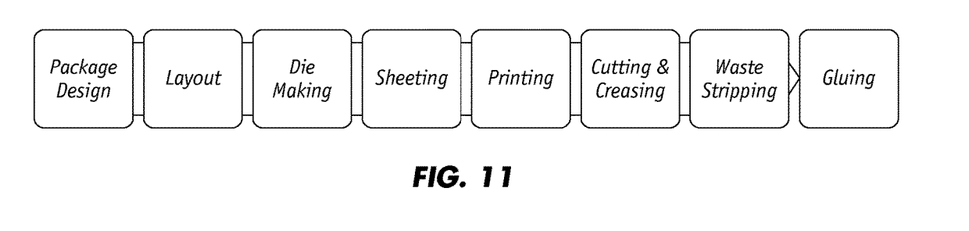
FIG. 11 is a flow diagram depicting the sequence of the main stages in fabricating folding cartons.

As depicting in FIG. 11, once a particular retail item is selected for production, a package is designed. Typically, a stock package is selected and sized but custom designed packages can be used as well although the cost will be higher. With the layout of the package a die is made for cutting the images of the layout. Sheeting is the process of producing the box board with the desired physical properties and finished that is used in the printing where images of the layout are applied onto the sheets. Unfolded boxes are formed when the layouts are cut and creased (or scored) before excess box board is trimmed in the waste stripping step. Finally, the box board is folded and glued to create the carton which is ready to package the retail item.

Figure 12:
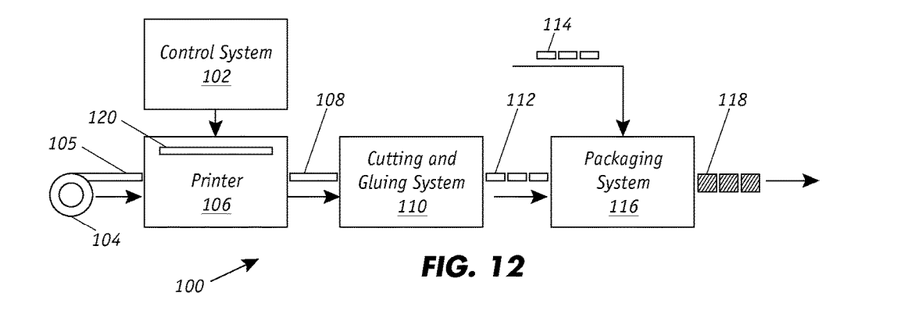
FIG. 12 shows an automatic printing production system.

FIG. 12 shows an automated print production system 100 that includes a control system 102, printer 106, cutting and gluing apparatus 110 and packaging apparatus 116. Print orders are received and processed at the control system or processor 102 wherein optimization of the print layout and other operations are performed. A continuous web or sheet 105 of paperboard is fed into printer 106 from roll 104. Printer 106 is equipped with printing plates 120 that transfer images to the paper to yielded printed paperboard 108 with the predetermined box layout arrangement(s) thereon. The cutting and gluing system 110 cuts the printed paperboard into individual pieces of paperboard 112, with defined shapes and with glue applied to selected surfaces, that are assembled in packaging system 116 into boxed products 118 each containing one or more products 114.

Development of Tool for Optimization of the Printing Layouts, Estimation of Paperboard Quantity and Selection of Vendor.

There are two major steps in the optimization process: (1) optimization of the printing layouts and estimation of paperboard quantity and (2) selection of vendor.

Figure 13:
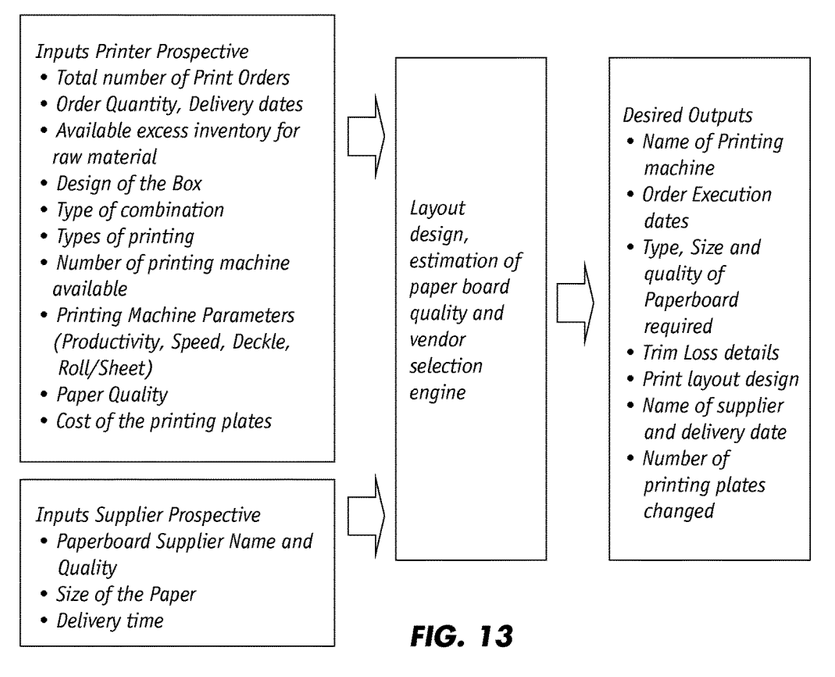
FIG. 13 is a chart listing the major inputs and outputs of an optimization engine.

For the optimization of printing layout, this tool takes inputs from printers as well as supplier prospective as illustrated in FIG. 13. The printer prospective input parameters for optimization engines include, for example: total number of print orders, order quantity, delivery dates, available excess inventory for raw material, design of the box, types of print combination, types of printing, number of printing machine available, printing machine parameters (productivity, speed, deckle, roll/sheet), paper quality, cost of the printing plates, paperboard supplier name, quality of paper, size of the paper and delivery time. The supplier prospective input parameters for optimization engines include, for example: paperboard supplier name and quality, size of the paper, and delivery time.

By considering the above parameters, the optimization engine generates the solution. Desired outputs of the solution is to identify the printing machine, order execution dates, type, size and quantity of paperboard required, trim loss details, print layout design, name of supplier and delivery date, and number of printing plates changed.

Constraints to Optimization Framework.

The generated solution must meet each of the dimension requirements of required packaging box types and must meet each dimension and type, quantity requirement (quantity of boxes). In addition, the selected package material Quality must be within the specified quality tolerances. The solution must meet the delivery date and it is critical to comply with customer requirements timely, effectively, efficiently, smoothly and satisfactorily. Inventory restrictions at converter warehouse must be considered. The generated solution must meet the spot market restriction such as cost and quantity available. Finally, there may be restrictions on future order quantity.

Calculating Paper Quantity Requirements.

Paperboard usage optimization comprises two optimization sub-processes: a printing layout optimization and an ordering optimization.

Figure 14:
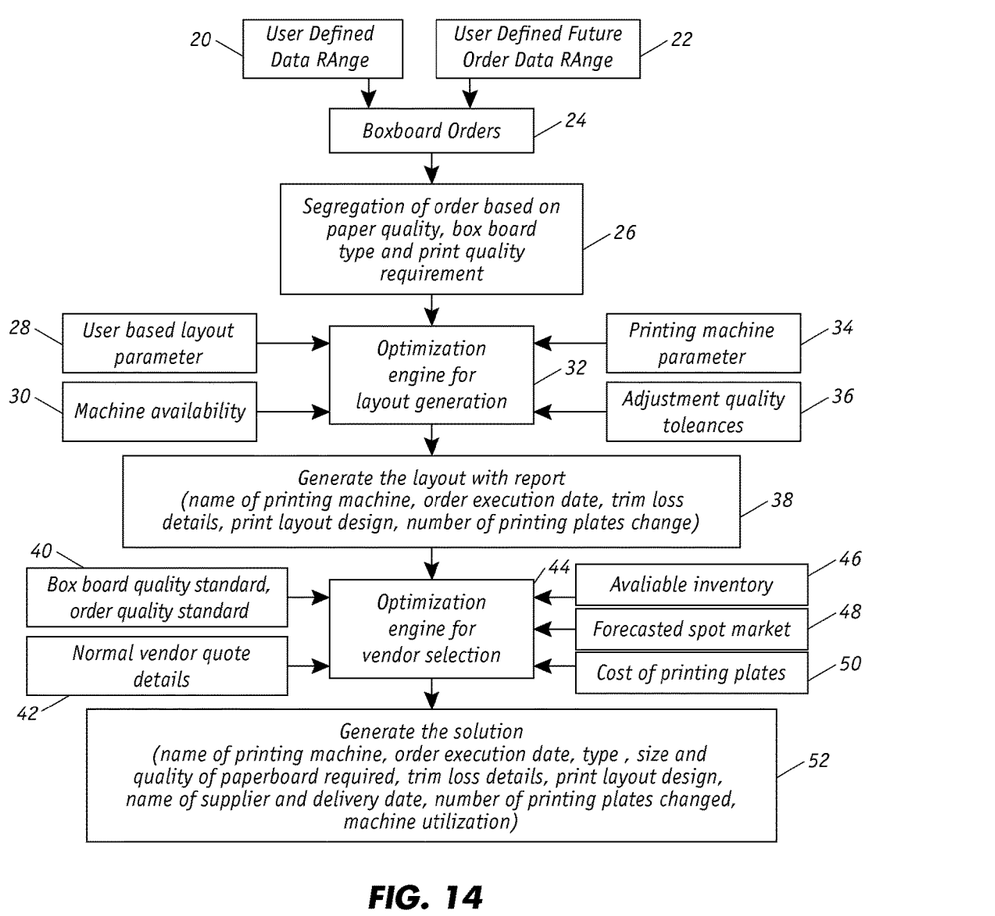
FIG. 14 is a flow chart implementing the optimization process.

FIG. 14 is the process diagram for the overall process where the overall objectives to be met by of the model are to reduce trims losses of boxboard and appropriate vendor selection. The process begins with the user providing the date range and/or period for which box board is ordered. In addition, the user provides the date range for future orders. Thereafter, all orders for the defined date range are collected and for each data range, orders based on the paper quality requirements, box board type and print quality requirement are segregated and the information is provided to a layout generation optimization engine. In particular, representative key inputs provided include: (1) printing machine parameters (deckle of printing machine, machine speed, cut speed, cut length range, minimum cut size, maximum cut size, maximum width, minimum width, number of impressions per hour, sheet feed/feb feed), (2) User based layout parameters (minimum gap between two layouts, type of die cutting, single order processing, multiple order processing), and (3) machine availability.

With these inputs, a packaging material optimizer generates an optimized solution which contains various parameters, including: name of printing machine, order Execution date, trim loss details, print layout design, and number of printing plates change.

Based on the above process, the user selects the optimized solution which is used as the order quantity requirements input. Vendor characteristics such as, for example, vendor facilities, procurement prices, step down cost, and delivery dates are provided to the paper quantity requirements and vendor selection engine. In addition (1) box board quality standards and order quantity standards (2) forecasted spot market material prices, vendors details, delivery dates of material, (3) cost of printing plates and (4) available excess inventory details to printer warehouse are provided to the vendor selection engine.

With the above information, the vendor selection optimizer generates an optimized solution that includes parameters, such as, for example: (1) name of printing machine, (2) order execution date, (3) type of box board, (4) size and quantity of paperboard required, (5) trim loss details, (6) print layout design, (7) name of supplier, (8) delivery date, (9) number of printing plates change, and (10) machine utilization.

Referring to FIG. 14, step 20 is user input for the order constraints for the current order. Step 22 is user inputs for the order constraints of planned future orders. Step 24 combines order constraints for current and planned future orders. Step 26 partitions and groups the universe of orders by paper quality, paperboard quality, and print quality requirements.

Step 28 is user input for layout constraints in printing. Step 30 is the list of available printing machines for order processing. Step 34 are the individual printing machine specifications. Step 36 are the quality tolerances required by the orders. Step 32 optimizes printing layout based on the inputs of steps 26, 28, 30, 34, and 36. Step 38 generates the optimized layout and specifies the printing machine, the order execution date(s), the number of printing plate changes during the print process, and the calculated trim loss of the optimized layout.

Step 40 is the paperboard quality and order requirements. Step 42 is the known standard vendor quotations for the order. Step 46 is the available vendor inventory of paperboard for the individual vendors. Step 48 is the forecast for the availability and cost of the paperboard in the spot market. Step 50 is the estimated cost of the printing plates used in producing the order(s). Step 44 takes the outputs of steps 38, 40, 42, 46, 48, and 50 and selects a vendor based on cost and availability. Step 52 outputs the select printing machine, order execution date, required paperboard quality, size, type, quantity, calculated trim loss, print layout design, vendor and delivery date, number of printing plate changes, and printing machine utilization.

Figure 15:
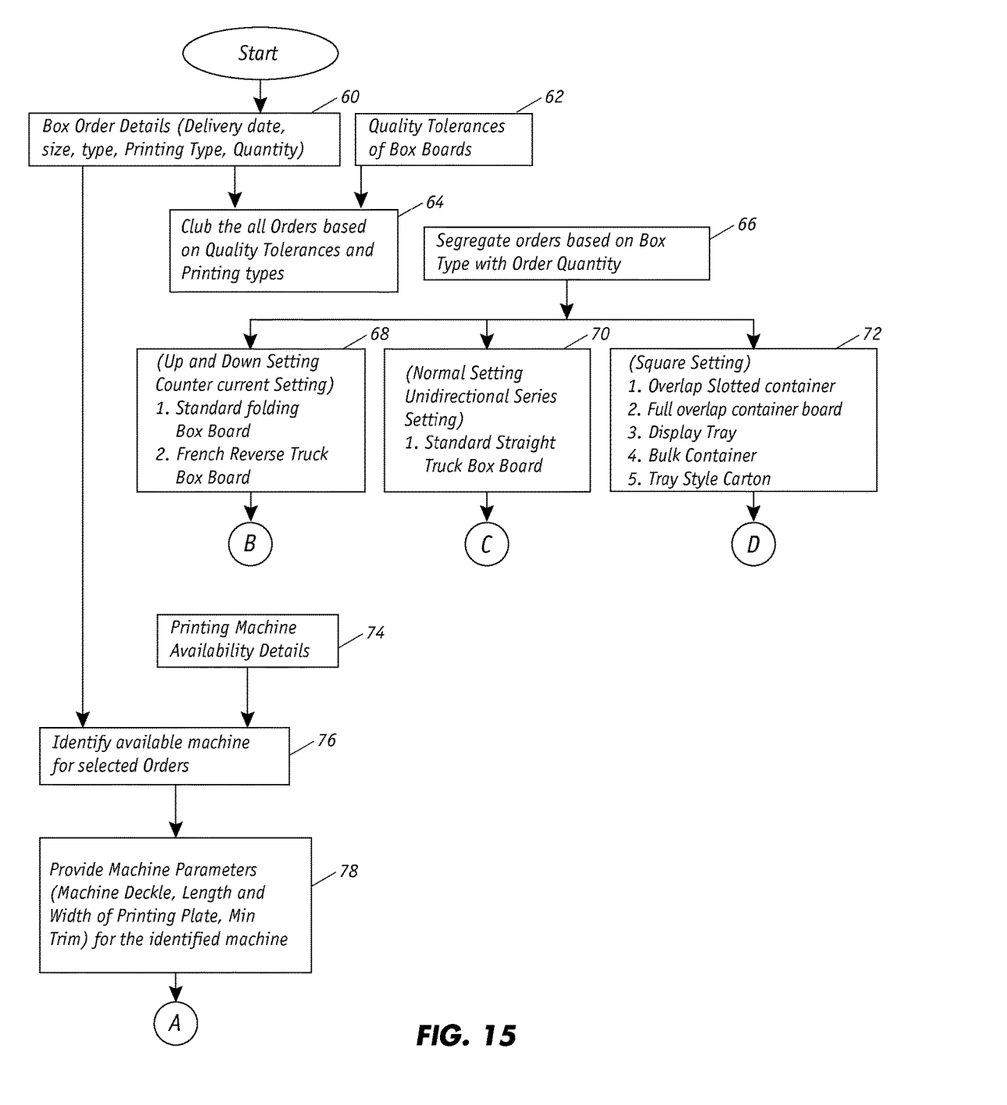
FIGS. 15 and 16 show the optimization process for generating the printing layout.
Figure 16:
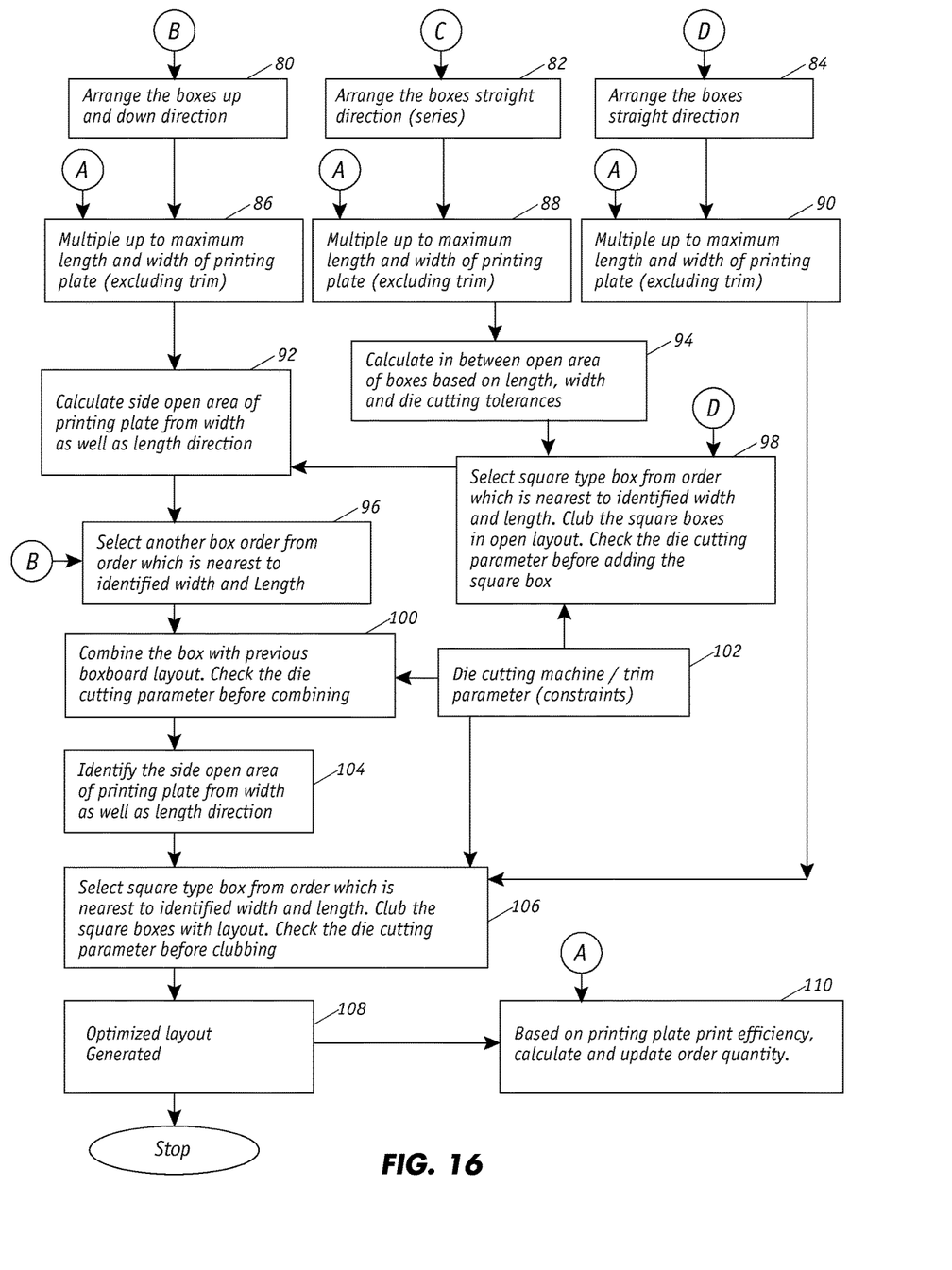

The printing layout optimization sub-process comprises the steps shown in the printing layout optimization process diagrams depicted in FIGS. 15 and 16. The inputs comprises the user's production requirements and constraints and the output is a printing layout optimized for paperboard utilization. As illustrated in the optimization process shown in FIG. 14, objectives of the invention include, for instance, reducing the available inventory in printer or converter warehouse facilities during layout generation and vendor selection process and selecting the printing machine for execution of box orders based on availability and cost of printing plates. In addition, another feature is the selection of vendor through clubbing or combining of boxboards orders based on or utilizing quality standard and tolerances. The quality standard and tolerances considered relate to both paperboard and boxes. Similarly, selecting a vendor can be based on cost of normal vendor quotes, delivery dates and forecasted spots market prices.

The flowchart of FIG. 14 further shows that the invention relates to techniques of (1) selecting optimized sizes and quality of paperboard required for printing, (2) optimizing of trim losses during box conversion, (3) enhancing printing machine efficiency and utilization through optimization of deckle of printing machine during layout generation, and (4) optimizing the layout based on clubbing of different orders though adjustment of quality tolerances.

Optimization Engine for Printing Layout Generation

As shown in FIG. 15, step 60 are the inputs that comprise the details of the box orders: (a) delivery windows, (b) box sizes, (c) printing types, and (d) quantity of boxes. Step 62 is the input specifying the required paperboard quality. Step 64 is the algorithm grouping orders by paperboard quality and printing type requirements. Steps 66, 68, 70, and 72 is the algorithm grouping orders by box type and order quantity. Step 68 groups the standard folding box board and French reverse truck box board. Step 70 groups the standard straight truck box board. Step 72 groups overlap slotted container, full overlap container board, display tray, bulk container, and tray style carton. Step 74 is database of the job schedules of printing machine pool. Steps 76 and 78 is the algorithm for selecting an available printing machine and its specifications based on the requirements of the grouped orders.

Continuing in FIG. 16, steps 80, 82, 84, 86, 88, and 90 set up the optimal layouts for the 3 widely used box types. Step 80 utilizes the results of step 68 to set the orientation(s) of the box layout patterns relative to the paperboard longitudinal direction and to each other for standard folding box board and French reverse truck box board box types. Step 86 determines the number of repeating layout patterns that can be placed onto the transverse or machine direction of the paperboard. Step 82 utilizes the results of step 70 to set the orientation(s) of the box layout patterns relative to the paperboard longitudinal direction and to each other for standard straight truck box board box type. Step 88 determines the number of repeating layout patterns that can be placed onto the transverse or machine direction of the paperboard. Step 84 utilizes the results of step 72 to set the orientation(s) of the box layout patterns relative to the paperboard longitudinal direction and to each other for overlap slotted container, full overlap container, display tray, bulk container, and tray style box board box types. Step 90 determines the number of repeating layout patterns that can be placed onto the transverse, or machine direction, of the paperboard.

Step 92 determines the unused area (side open area) of the printing plate for nesting the layout of standard folding box board or French reverse truck box board from step 86 or the square type box from step 98. The calculated open area is used in step 96 for selection of another box order that can be laid out within the open area. Step 94 determines the unused area available between the layout of standard straight truck box board of step 88. The calculated unused area is used in step 98. In particular, this method identifies the open area between two adjacent boxes through consideration of the die cutting standard and thus avoids the failure of the box cutting process.

Step 96 uses the result of step 92 to select another box order from the available orders that can fill the calculated side open area of step 92. Step 98 selects from the available orders an order with square type boxes that will fill the open area calculated in step 94 for standard straight truck box board.

Step 100 merges the initial box layout with the box layout of the order selected to fill the open area existing after the layout of step 86.

Step 102 provides die cutting machine parameter for use in steps 98 and 100. Step 104 determines the unused area (side open area) available after step 100. Step 106 selects a further square type box order from the available orders for nesting within the available unused are (side open area) after step 100. Step 108 generates the final optimized layout. Step 110 calculates the order quantity based on the printing plate usage. As illustrated in the optimization process shown in FIGS. 15 and 16, the print layout optimization is preferably carried out using sequential optimization methodology based on printing boxes designs/types. Boxes are preferably sequentially allocated in a print layout as per the following sequence: (a) up and down setting, (b) normal setting, and (c) square setting. The allocation of square boxes can be by considering print machine and dye cutting machine parameters.

The invention can be implemented as a series of layout generations based on box order quantities; thereafter, the optimized print layout is generated in a cyclic nature until the box order quantity is fulfilled. The paperboard quantities and sizes required are based on the print layout.

Optimization Engine Paperboard Requirements and Vendor Selection.

Figure 17:
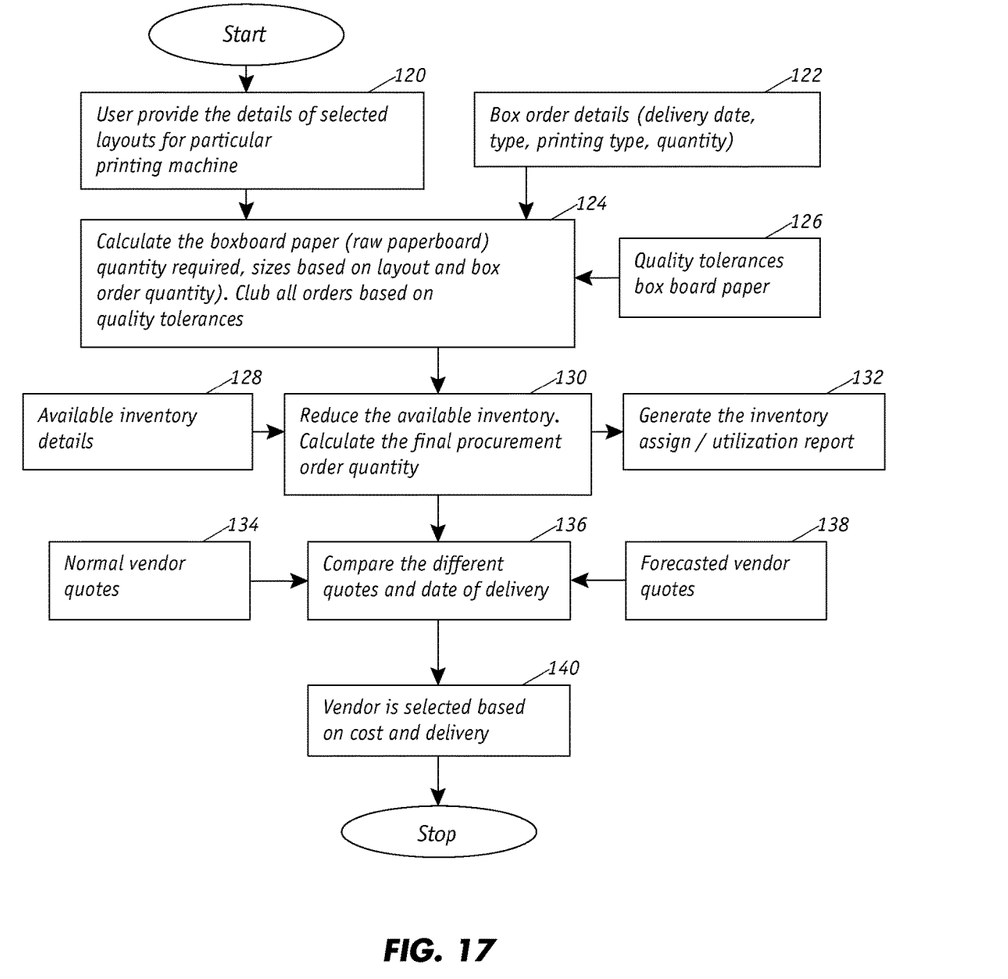
FIG. 17 shows the optimization process for generating paperboard requirements and vendor selection.

The order optimization sub-process is shown in FIG. 17 where the user selected layout for selected printer, estimated vendor quotations, along with the box order details such as delivery window, box type, printing type, quality tolerance of the box board paper, quantity, available vendor box board inventory, are used to calculate the raw material requirement and vendor selection. In particular, step 120 is the user input specifying the selected optimized box layout for available printing machines. Step 122 is the user input specifying the box order details comprising delivery window, box type, printing type, and order quantity. Step 126 is the user input of the quality tolerances of box board paper. Step 124 utilizes the inputs from step 120, 122, and 126 to calculated the raw paperboard quantity required, the paperboard size based on box layouts and box order quantities and groups the available orders based on paperboard quality tolerance requirements.

Step 128 provides the available vendor inventory of box board paper. Step 130 calculates the box board paper to be procure based on the available vendor inventory of box board paper and assigns the quantity require from the available inventory and decrements the assigned quantity from the available inventory. Step 132 generates an inventory assignment and utilization report. The assignment of available inventory during the ordering process removes the inventory from the next ordering cycle. Step 134 is the inputs of the vendor quotes details, comprising current prices and delivery dates. Step 138 are the inputs of the vendor quotes details comprising forecasted prices and delivery dates. Step 136 compares the set of current and forecasted quotes to minimize price at a given delivery window or alternatively optimize the price and delivery window pair. Step 140 selects the vendor based on the output of step 136.

Figure 18:
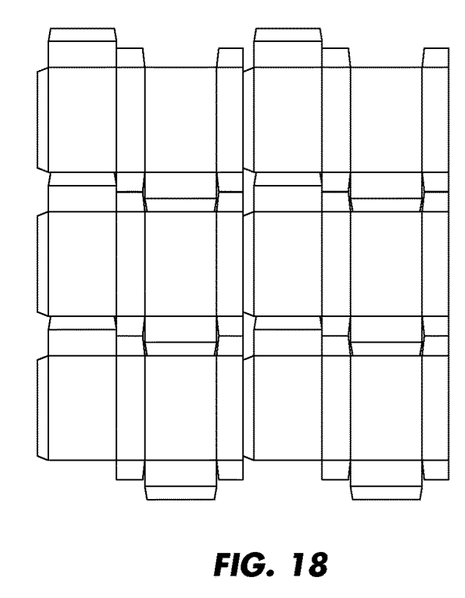
FIGS. 18, 19, and 20 are formats depicting different box layout arrangements.
Figure 19:
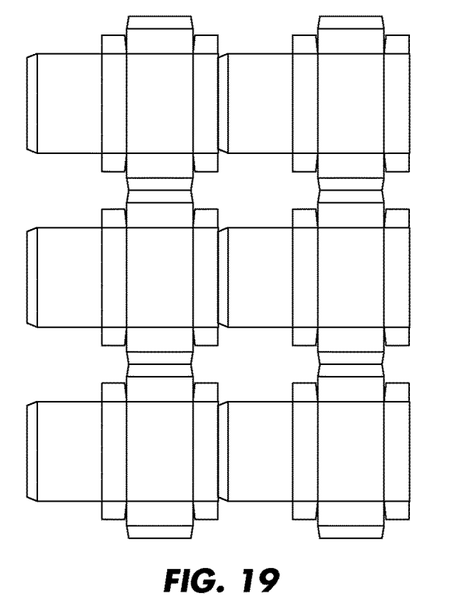
Figure 20:
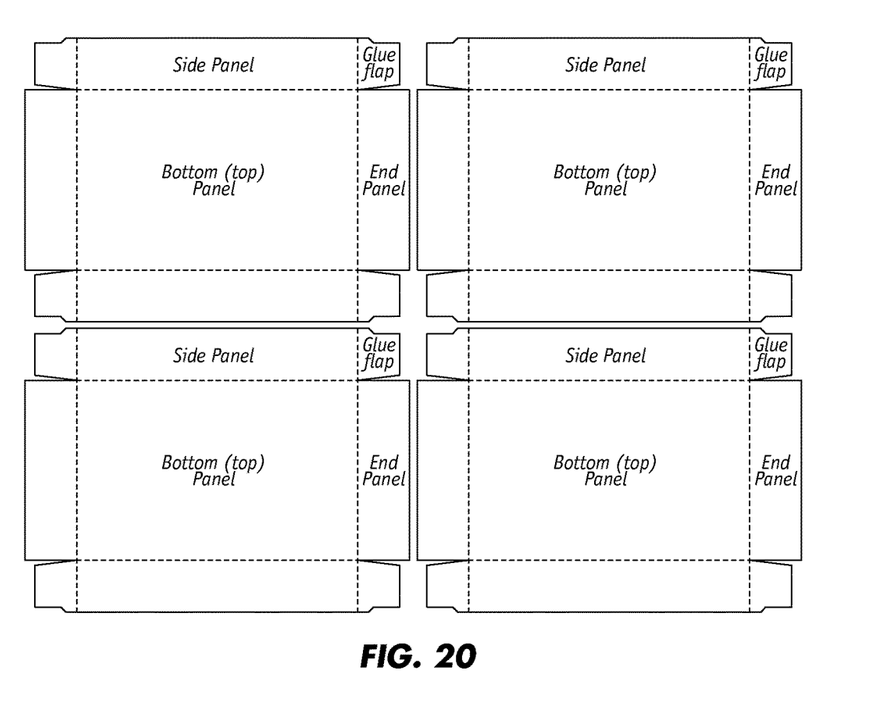

As indicated in step 66 of FIG. 15, orders are segregated based on box type along with order quantity. FIG. 18 illustrates an example of a layout for boxes that are counter current setting during layer generation (up and down setting) as expressed in step 68. FIG. 19 illustrates an example of a layout for the class of boxes that are unidirectional set during layout generation with all boxes being set in series during layout generation as expressed in step 70. Finally, FIG. 20 illustrates an example of a layout of square types of boxes: in this class, the boxes are set in series during layout generation as expressed in step 72.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of optimizing production of packaging comprising the steps of:
    (a) providing a source of a sheet of packaging material, which comprises a sheet of paperboard or box board with a defined fiber direction, that includes generating a packaging material requirements specification and selecting a packaging material vendor;
    (b) providing a printer having a printer plate that is configured to transfer images to the sheet of packaging material to yield a printed sheet with a predetermined box print layout arrangement;
    (c) providing a cutting system that converts the printed sheet into individual pieces of packaging material;
    (d) providing a packaging system that folds the individual pieces of packaging material, which are made in step (c), to construct individual boxes wherein the individual pieces of packaging material has a length with a direction that is parallel to the fiber direction so that the boxes that are constructed have grain directions that are parallel to the fiber direction;
    (e) aggregating customer orders subject to the constraints of order delivery timing and packaging material properties requirements; and
    (f) generating a printed sheet with a predetermined box print layout arrangement that minimizes packaging material wastage by nesting multiple customer orders into a single production run wherein the predetermined box print layout arrangement contains an arrangement of a plurality of box patterns and wherein the arrangement defines exterior un-utilized regions and interior un-utilized regions and the arrangement minimizes the area of the interior un-utilized regions wherein the predetermined box print layout arrangement is optimized by sequential optimization based on the design or type of boxes produced wherein the boxes are sequentially allocated in the predetermined box print layout arrangement first with boxes having up and down settings, second with boxes having normal settings and third with boxes having square settings.

2. The method of claim 1 wherein step (e) comprises obtaining printer vendor specifications.

3. The method of claim 1 wherein the allocation of square boxes is based on printer and dye cutting machine parameters.

4. A method of optimizing production of packaging comprising the steps of:
    (a) providing a source of a sheet of packaging material which comprises a sheet of paperboard or box board with a defined fiber direction, that includes generating a packaging material requirements specification and selecting a packaging material vendor;
    (b) providing a printer having a printer plate that is configured to transfer images to the sheet of packaging material to yield a printed sheet with a predetermined box print layout arrangement;

(c) providing a cutting system that converts the printed sheet into individual pieces of packaging material;

(d) providing a packaging system that folds the individual pieces of packaging material, which are made in step (c), to construct individual boxes wherein the individual pieces of packaging material has a length with a direction that is parallel to the fiber direction so that the boxes that are constructed have grain directions that are parallel to the fiber direction;

(e) aggregating customer orders subject to the constraints of order delivery timing and packaging material properties requirements by combining different customer orders based on quality standards and tolerances for the packaging material; and (f) generating a printed sheet with a predetermined box print layout arrangement that minimizes packaging material wastage by nesting multiple customer orders into a single production run and by optimizing the predetermined box print layout arrangement by combining different customer orders through adjustment of the tolerances for the packaging material wherein the predetermined box print layout arrangement contains an arrangement of a plurality of box patterns and wherein the arrangement defines exterior un-utilized regions and interior un-utilized regions and the arrangement minimizes the area of the interior un-utilized regions.

5. The method of claim 1 wherein step (f) comprises enhancing printer efficiency and utilization through optimization of printer deckle or width through nesting of multiple boxes in the same print layout arrangement.

6. The method of claim 1 wherein step (a) comprises selecting a packaging material vendor based on quality standard and tolerances.

7. The method of claim 6 wherein forecasted spot market prices for packaging material is a factor considered in selecting the packaging material vendor.

8. The method of claim 1 further comprising step (g) of estimating the quantity and size of packaging material required based on printer plate configuration.

9. The method of claim 1 wherein step (a) comprises selecting a paperboard or box board vendor based on delivery date.

10. The method of claim 1 wherein step (a) comprises selecting a paperboard or box board vendor and utilizing available inventory to reduce warehousing costs.

11. The method of claim 1 wherein step (b) comprises selecting a printer based on availability and when a plurality of printers are available at the same time predetermined box print layout arrangements are generated for at two available printers.

12. The method of claim 1 wherein step (f) comprises generating a printed sheet with a series of predetermined box print layout arrangements until box board quantity is completed utilized.

13. The method of claim 12 wherein step (f) comprises print layout arrangement optimization that is cyclic in nature and further comprising generating an optimized print layout arrangement until box board order quantity is fulfilled.

14. The method of claim 1 wherein step (f) comprises selecting a paperboard or box board order based on most fittable size in term of width and length for nesting the boxes inside open areas.

15. A method of optimizing production of packaging comprising the steps of:

(a) providing a source of a sheet of packaging material which comprises a sheet of paperboard or box board with a defined fiber direction, that includes generating a packaging material requirements specification and selecting a packaging material vendor;

(b) providing a printer having a printer plate that is configured to transfer images to the sheet of packaging material to yield a printed sheet with a predetermined box print layout arrangement;

(c) providing a cutting system that converts the printed sheet into individual pieces of packaging material;

(d) providing a packaging system that folds the individual pieces of packaging material, which are made in step (c), to construct individual boxes wherein the individual pieces of packaging material has a length with a direction that is parallel to the fiber direction so that the boxes that are constructed have grain directions that are parallel to the fiber direction;

(e) aggregating customer orders subject to the constraints of order delivery timing and packaging material properties requirements; and (f) generating a printed sheet with a predetermined box print layout arrangement that minimizes packaging material wastage by nesting multiple customer orders into a single production run wherein the predetermined box print layout arrangement contains an arrangement of a plurality of box patterns and wherein the arrangement defines exterior un-utilized regions and interior un-utilized regions and the arrangement minimizes the area of the interior un-utilized regions and wherein a resultant of a solution print layout optimization engine is used as a target for packaging material vendor selection.

16. The method of claim 1 wherein each box constructed in step (d) contains a stored item.

17. The method of claim 4, wherein each box constructed in step (d) contains a stored item.

18. The method of claim 15 wherein each box constructed in step (d) contains a stored item.

* * * * *